(12) United States Patent
Yun et al.

(10) Patent No.: US 11,670,768 B2
(45) Date of Patent: Jun. 6, 2023

(54) NICKEL-BASED ACTIVE MATERIAL PRECURSOR FOR LITHIUM SECONDARY BATTERY, METHOD OF PREPARING THE SAME, NICKEL-BASED ACTIVE MATERIAL FOR LITHIUM SECONDARY BATTERY FORMED THEREFROM, AND LITHIUM SECONDARY BATTERY INCLUDING POSITIVE ELECTRODE INCLUDING NICKEL-BASED ACTIVE MATERIAL

(71) Applicant: Samsung SDI Co., Ltd., Yongin-si (KR)

(72) Inventors: Pilsang Yun, Yongin-si (KR); Jangsuk Hyun, Yongin-si (KR); Wooyoung Yang, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 16/452,282

(22) Filed: Jun. 25, 2019

(65) Prior Publication Data

US 2019/0393502 A1 Dec. 26, 2019

(30) Foreign Application Priority Data

Jun. 26, 2018 (KR) ........................ 10-2018-0073588

(51) Int. Cl.
*H01M 4/525* (2010.01)
*H01M 4/36* (2006.01)
(Continued)

(52) U.S. Cl.
CPC .......... *H01M 4/525* (2013.01); *C01G 53/006* (2013.01); *H01M 4/366* (2013.01); *H01M 4/505* (2013.01);
(Continued)

(58) Field of Classification Search
None
See application file for complete search history.

(56) References Cited

U.S. PATENT DOCUMENTS 8,728,666 B2   5/2014  Itou et al.
9,567,238 B2   2/2017  Kawanaka et al.
(Continued)

FOREIGN PATENT DOCUMENTS

CN   102315447 A   1/2012
CN   105024063 A   11/2015
(Continued)

OTHER PUBLICATIONS

Extended European Search Report for corresponding European Patent Application No. 19182526.4, dated Sep. 23, 2019, 9 pages.
(Continued)

*Primary Examiner* — Jonathan Crepeau
*Assistant Examiner* — Angela J Martin
(74) *Attorney, Agent, or Firm* — Lewis Roca Rothgerber Christie LLP

(57) ABSTRACT

A nickel-based active material precursor for a lithium secondary battery includes: a secondary particle including a plurality of particulate structures, wherein each particulate structure includes a porous core portion and a shell portion, the shell portion including primary particles radially arranged on the porous core portion; and the secondary particle has a plurality of radial centers. When the nickel-based active material precursor is used, a nickel-based positive active material having a short lithium ion diffusion distance, in which intercalation and deintercalation of lithium are facilitated, may be obtained. A lithium secondary battery manufactured using the positive active material may exhibit enhanced lithium availability, and may exhibit enhanced capacity and lifespan due to suppression of crack
(Continued)

formation in the active material during charging and discharging.

16 Claims, 7 Drawing Sheets

(51) Int. Cl.
  *H01M 4/505*      (2010.01)
  *H01M 10/0525*     (2010.01)
  *C01G 53/00*      (2006.01)
  *H01M 4/02*      (2006.01)

(52) U.S. Cl.
  CPC ..... *H01M 10/0525* (2013.01); *C01P 2004/50* (2013.01); *H01M 2004/028* (2013.01)

(56) References Cited

U.S. PATENT DOCUMENTS

| | | | |
|---|---|---|---|
| 10,581,110 B2 | 3/2020 | Kwon et al. | |
| 11,296,316 B2 | 4/2022 | Kaneda et al. | |
| 2003/0164674 A1 | 9/2003 | Imamura | |
| 2009/0029253 A1* | 1/2009 | Itou | H01M 10/0525 429/223 |
| 2012/0009474 A1 | 1/2012 | Yanagihara et al. | |
| 2016/0049647 A1 | 2/2016 | Park et al. | |
| 2016/0181597 A1 | 6/2016 | Kim et al. | |
| 2017/0222221 A1 | 8/2017 | Park et al. | |
| 2017/0324091 A1 | 11/2017 | Hasegawa et al. | |
| 2017/0324092 A1 | 11/2017 | Yoshida et al. | |
| 2018/0013129 A1 | 1/2018 | Lee et al. | |
| 2018/0026267 A1 | 1/2018 | Kim et al. | |
| 2018/0048015 A1 | 2/2018 | Lee et al. | |
| 2018/0108940 A1 | 4/2018 | Kwon et al. | |
| 2018/0151876 A1* | 5/2018 | Kim | H01M 4/505 |
| 2018/0159128 A1* | 6/2018 | Kim | H01M 10/052 |
| 2018/0212237 A1 | 7/2018 | Lee et al. | |
| 2019/0148721 A1 | 5/2019 | Park et al. | |
| 2019/0260024 A1* | 8/2019 | Nakamura | H01M 4/505 |
| 2019/0326596 A1 | 10/2019 | Yun et al. | |
| 2019/0393502 A1 | 12/2019 | Yun et al. | |
| 2020/0083530 A1 | 3/2020 | Yun et al. | |
| 2020/0119351 A1 | 4/2020 | Yun et al. | |

FOREIGN PATENT DOCUMENTS

| | | | | |
|---|---|---|---|---|
| CN | 107004852 A | | 8/2017 | |
| CN | 107534140 A | | 1/2018 | |
| CN | 107644982 A | | 1/2018 | |
| CN | 107742720 A | | 2/2018 | |
| CN | 108028369 A | | 5/2018 | |
| CN | 108155357 A | | 6/2018 | |
| CN | 108155357 A | * | 6/2018 | ............ H01M 4/362 |
| CN | 110642302 A | | 1/2020 | |
| EP | 3331066 A1 | | 6/2018 | |
| EP | 3550640 A1 | | 10/2019 | |
| EP | 3588632 A1 | | 1/2020 | |
| JP | 2015-72800 A | | 4/2015 | |
| JP | 2017-533568 A | | 11/2017 | |
| JP | 2018-500720 A | | 1/2018 | |
| JP | 2018-506156 A | | 3/2018 | |
| JP | 2018-092931 | * | 6/2018 | ............ H01M 4/505 |
| JP | 2018-515884 A | | 6/2018 | |
| JP | 2018-521456 A | | 8/2018 | |
| KR | 10-2007-0116158 A | | 12/2007 | |
| KR | 10-2010-0099337 A | | 9/2010 | |
| KR | 10-2013-0138073 A | | 12/2013 | |
| KR | 10-2015-0095428 A | | 8/2015 | |
| KR | 10-2016-0129764 A | | 11/2016 | |
| KR | 10-2018-0063849 A | | 6/2018 | |
| KR | 10-2020-0042868 A | | 4/2020 | |
| WO | WO 2017/150945 A1 | | 9/2017 | |
| WO | 2018/021555 A1 | | 2/2018 | |
| WO | WO 2018/101806 A1 | | 6/2018 | |
| WO | WO 2018/101807 A1 | | 6/2018 | |
| WO | WO 2018/101808 A1 | | 6/2018 | |
| WO | WO 2018/101809 A1 | | 6/2018 | |
| WO | WO 2018/105945 A2 | | 6/2018 | |

OTHER PUBLICATIONS

European Patent Office Action for corresponding European Patent Application No. 19 182 526.4, dated Aug. 12, 2020, 7 pages.
Korean Intellectual Property Office Action for corresponding Korean Patent Application No. 10-2018-0073588, dated Jul. 1, 2020, 7 pages.
U.S. Final Office Action dated Oct. 22, 2021, issued in U.S. Appl. No. 16/539,768 (11 pages).
Liu, Wenyuan et al., "Facile synthesis of hierarchical porous Ni-rich LiNi0.6Co0.2Mn0.2O2 cathode material with superior high-rate capability," Ionics, vol. 22, 2016, 10 pages.
EPO Extended Search Report dated Nov. 11, 2019, for European Patent Application No. 19191446.4 (7 pages).
Japanese Office Action dated May 25, 2020, issued in corresponding Japanese Patent Application No. 2019-118515 (6 pages).
EPO Office Action dated May 19, 2021 for European Patent Application No. 19191446.4 (5 pages).
Japanese Notice of Allowance dated Mar. 22, 2021 for Japanese Patent Application No. 2019-148833 (3 pages).
U.S. Office Action dated Jul. 9, 2021, issued in U.S. Appl. No. 16/539,768 (13 pages).
Chinese Office Action, with English translation, dated Sep. 30, 2021, issued in corresponding Chinese Patent Application No. 201910571521.5 (18 pages).
Chinese Office Action, with English translation, dated Sep. 24, 2021, issued in corresponding Chinese Patent Application No. 201910747827.1 (26 pages).
U.S. Restriction Requirement from U.S. Appl. No. 16/539,768, dated Apr. 30, 2021, 6 pages.
U.S. Notice of Allowance dated Jan. 20, 2022, issued in U.S. Appl. No. 16/539,768 (7 pages).
U.S. Notice of Allowance dated May 5, 2022, issued in U.S. Appl. No. 16/539,768 (7 pages).
Chinese Office Action, with English translation, dated Apr. 29, 2022, issued in corresponding Chinese Patent Application No. 201910571521.5 (15 pages).
Chinese Office Action, with English translation, dated Nov. 1, 2022, issued in Chinese Patent Application No. 201910571521.5 (16 pages).
EPO Office Action dated Dec. 15, 2022, issued in European Patent Application No. 19182526.4 (4 pages).
Japanese Office Action dated Dec. 19, 2022, issued in Japanese Patent Application No. 2021-092394 (5 pages).
U.S. Notice of Allowance dated Nov. 23, 2022, issued in U.S. Appl. No. 16/539,768 (7 pages).
EPO Office Action dated Mar. 29, 2023, issued in European Patent Application No. 19191446.4 (5 pages).
Chinese Office Action dated Apr. 1, 2023, issued in corresponding Chinese Patent Application No. 201910571521.5 (7 pages).

* cited by examiner

NICKEL-BASED ACTIVE MATERIAL PRECURSOR FOR LITHIUM SECONDARY BATTERY, METHOD OF PREPARING THE SAME, NICKEL-BASED ACTIVE MATERIAL FOR LITHIUM SECONDARY BATTERY FORMED THEREFROM, AND LITHIUM SECONDARY BATTERY INCLUDING POSITIVE ELECTRODE INCLUDING NICKEL-BASED ACTIVE MATERIAL

CROSS-REFERENCE TO RELATED APPLICATION

This application claims the benefit of Korean Patent Application No. 10-2018-0073588, filed on Jun. 26, 2018, in the Korean Intellectual Property Office, the entire content of which is incorporated herein by reference.

BACKGROUND

1. Field

One or more embodiments of the present disclosure relate to a nickel-based active material precursor for a lithium secondary battery, a method of preparing the nickel-based active material precursor, a nickel-based (positive) active material formed from the nickel-based active material precursor, and a lithium secondary battery including a positive electrode including the nickel-based active material.

2. Description of the Related Art

In line with the development of portable electronic devices, communication devices, and/or the like, lithium secondary batteries with high energy density are desired. However, such lithium secondary batteries with high energy density may exhibit reduced safety, and thus there is a desire for improvement in this regard. Lithium nickel manganese cobalt composite oxide, a lithium cobalt oxide, and/or the like are used as positive active materials in such lithium secondary batteries. However, in these positive active materials, a transfer distance of lithium ions during charging and discharging is affected by the size of secondary particles of these positive active materials, and charge/discharge efficiency is not high when the physical distance (size) is large. In addition, cracks may occur in primary particles as charging and discharging processes are repeated, and thus lithium secondary batteries including these positive active materials may exhibit a deteriorated long-term lifespan, increased resistance, and/or unsatisfactory capacity characteristics. Therefore, additional improvements are desired.

SUMMARY

One or more aspects of embodiments of the present disclosure are directed toward a nickel-based active material precursor for a lithium secondary battery, which exhibits enhanced lithium ion availability.

One or more aspects of embodiments of the present disclosure are directed toward a method of preparing the above-described nickel-based active material precursor.

One or more aspects of embodiments of the present disclosure are directed toward a nickel-based active material obtained from the above-described nickel-based active material precursor and a lithium secondary battery including a positive electrode including the nickel-based active material.

Additional aspects will be set forth in part in the description which follows and, in part, will be apparent from the description, or may be learned by practice of the presented embodiments.

One or more example embodiments of the present disclosure provide a nickel-based active material precursor for a lithium secondary battery including: a secondary particle including a plurality of particulate structures, wherein each particulate structure includes a porous core portion and a shell portion, the shell portion including primary particles radially arranged on the porous core portion, and the secondary particle has a plurality of radial centers.

One or more example embodiments of the present disclosure provide a method of preparing a nickel-based active material precursor for a lithium secondary battery including: a first act of supplying raw materials at a first feed rate and stirring the raw materials to form a precursor seed; a second act of supplying raw materials at a second feed rate to the precursor seed formed by the first act, and stirring the resulting mixture to grow the precursor seed by agglomeration of the mixture; and a third act of supplying raw materials at a third feed rate to precursor particles grown by the second act, and stirring the resulting mixture to control the growth of the precursor particles, wherein the raw materials include a complexing agent, a pH adjuster, and a metal-containing raw material for forming a nickel-based active material precursor, and the second feed rate of the metal-containing raw material is higher than the first feed rate of the metal-containing raw material, and the third feed rate of the metal-containing raw material is higher than the second feed rate of the metal-containing raw material.

One or more example embodiments of the present disclosure provide a nickel-based active material for a lithium secondary battery, the nickel-based active material being obtained from the nickel-based active material precursor.

One or more example embodiments of the present disclosure provide a lithium secondary battery including a positive electrode including the nickel-based active material.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
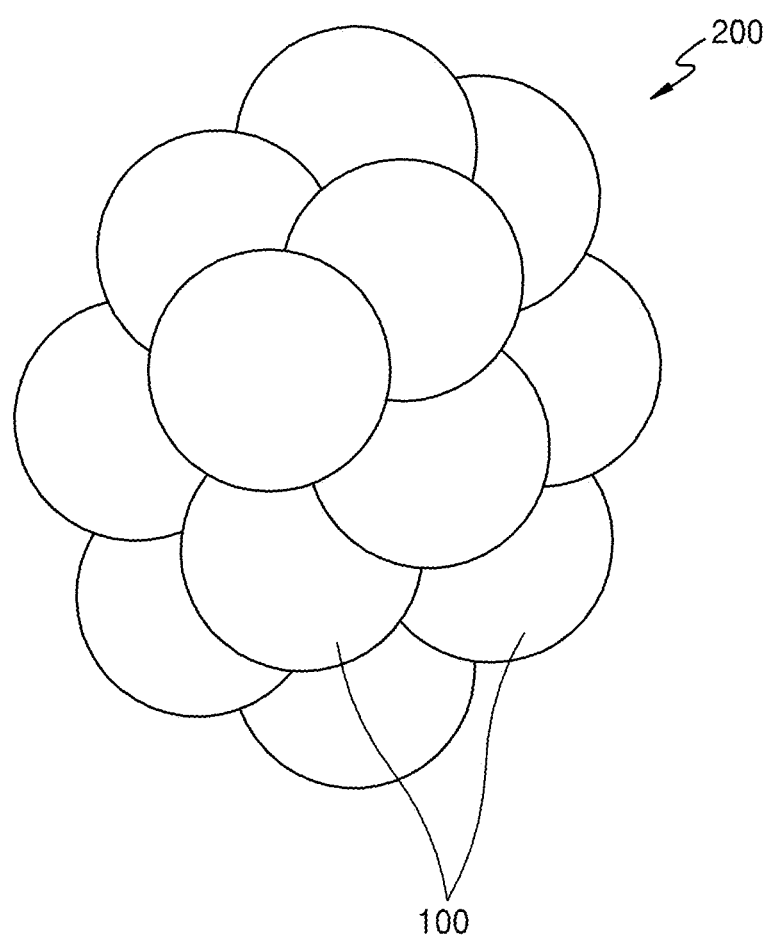
FIG. 1 is a schematic view of a secondary particle included in a nickel-based active material precursor according to an embodiment of the present disclosure.

Reference will now be made in more detail to embodiments, examples of which are illustrated in the accompanying drawings, wherein like reference numerals refer to like elements throughout and duplicative descriptions thereof may not be provided. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of", "one of", "selected from", "at least one selected from", and "one selected from", when preceding a list of elements, modify the entire list of elements and do not modify the individual elements of the list.

Hereinafter, a nickel-based active material precursor for a lithium secondary battery, according to an embodiment of the present disclosure, a method of preparing the nickel-based active material precursor, a nickel-based active material formed therefrom, and a lithium secondary battery including a positive electrode including the nickel-based active material will be described in more detail. The following is provided for illustrative purposes only and is not intended to limit the scope of the present disclosure, and the present disclosure should be defined only by the scope of the following claims.

As used herein, "nickel-based active material" may refer to a nickel-based positive active material, and "nickel-based active material precursor" may refer to a precursor for forming a nickel-based positive active material As used herein, the term "particulate structure" refers to a structure having the form of multiple particles, formed by agglomeration of a plurality of primary particles.

As used herein, the term "isotropic" refers to an arrangement in which the properties (e.g., structure) of an object do not vary even when a direction in which an object is observed is changed. For example, an "isotropic arrangement" may be substantially radially symmetric and/or substantially symmetric along all major axes. For example, "isotropic arrangement" may refer to an arrangement having an arbitrary or unknown orientation.

As used herein, the term "multi-center" refers to inclusion of a plurality of centers in a single particle. For example, a secondary particle of a positive active material may be formed of a plurality of smaller particles, each having their own geometric center. When multi-centered particles are present, lithium ion transfer (diffusion) distances from surfaces to centers of particles may be shortened (e.g., relative to a particle having a single center and the same effective radius as the plurality of centers). Due to the shortened transfer distance of lithium ions, a particle structure having reduced internal resistance and capable of providing high charge/discharge efficiency and a long lifespan is obtained. As used herein, the term "a plurality of centers" may refer to 2 or more centers, 3 or more centers, 4 or more centers, 5 or more centers, or 10 or more centers.

Figure 2A:
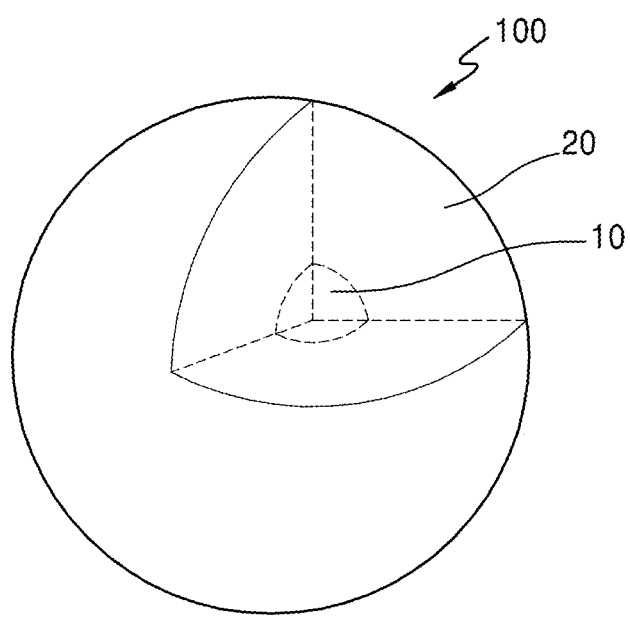
FIG. 2A is a schematic partial perspective view of a particulate structure included in the secondary particle of FIG. 1.
Figure 2B:
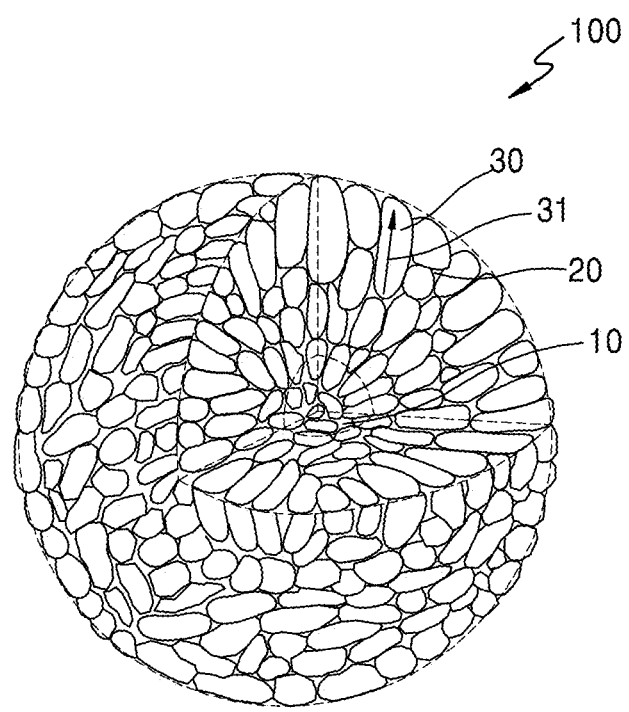
FIG. 2B is a more detailed partial perspective view of a particulate structure included in the secondary particle of FIG. 1.

As used herein and as illustrated in FIGS. 2A and 2B, the term "radial center" refers to the center of a particulate structure including a porous core portion and a shell portion including primary particles radially arranged on the porous core portion.

As used herein and as illustrated in FIGS. 2A and 2B, the term "radial" refers to a structure or form in which major axes of particles or elements (for example, primary particles in the shell portion) are substantially perpendicular to a surface of the particulate structure, or form an angle of ±30 degrees or less with respect to the perpendicular direction. As used herein, the term "radially arranged" may refer to radial alignment, for example, substantial alignment of particles and/or their axis along radial directions in a spherical coordinate system, wherein the center of the particle is substantially located at the center of those coordinates. The terms "perpendicular" and "normal" may be interchangeably used when referring to alignment or orientation with respect to a plane or surface.

As used herein to refer to particles, the term "size" refers to an average diameter when the particles are spherical, and an average major axis length when the particles are not spherical. The average diameter is the mean particle diameter (D50), which is defined as the particle diameter corresponding to the cumulative diameter distribution at 50%, which represents the particle diameter below which 50% of the sample lies. The size of particles may be measured using any suitable method, for example by using a particle size analyzer (PSA).

As used herein, the term "pore size" refers to an average pore diameter or average opening width of a pore when the pores are spherical or circular. When pores are not spherical or not circular, (for example, when the pores are elliptical), "pore size" refers to an average major axis length.

As used herein, the term "irregular porous pore" refers to pores that have an irregular pore size and shape and do not have uniformity. A core portion including irregular porous pores may include amorphous particles unlike the shell portion, and such amorphous particles may be irregularly (non-uniformly) arranged unlike the shell portion.

In the following drawings, the size of each element in the drawings may be exaggerated for clarity and convenience of explanation. In addition, embodiments set forth herein are provided for illustrative purposes only, and various modifications may be made to these embodiments. It will be understood that the expressions "above" and "on" include not only "directly on," but also "being on" without contact between two elements. For example, the element can be directly on the other element, or intervening element(s) may also be present. In contrast, when an element is referred to as being "directly on" or "directly above" another element, no intervening elements are present.

A nickel-based active material precursor for a lithium secondary battery, according to an embodiment of the present disclosure, includes a secondary particle including a plurality of particulate structures, in which each particulate structure includes a porous core portion and a shell portion, wherein the shell portion includes primary particles radially arranged on the porous core portion, and wherein the secondary particle has a plurality of radial centers.

Referring to FIG. 1, the nickel-based active material precursor for a lithium secondary battery includes a secondary particle 200 including a plurality of particulate structures 100. Referring to FIGS. 2A and 2B, each of the particulate structures 100 includes a porous core portion 10 and a shell portion 20 including primary particles 30 radially arranged on the porous core portion 10. Referring to FIGS. 1, 2A, and 2B, the secondary particle 200 includes the particulate structures 100, and each of the particulate structures 100 has a radial center. Thus, the secondary particle 200 has a plurality of radial centers.

Referring to FIGS. 1, 2A, and 2B, since the secondary particle 200, which is an assembly of the particulate structures 100, has a plurality of radial centers, a diffusion distance of lithium ions during charging and discharging is shortened, compared to a secondary particle having a single particulate structure. Accordingly, in a nickel-based active material obtained from the nickel-based active material precursor including the secondary particles 200, the use of lithium ions (e.g., the use of a maximum or increased number of lithium ions as part of the battery capacity) is further facilitated. In addition, since the particulate structure 100 includes the porous core portion 10, and the primary particles 30 are radially arranged on the porous core portion 10 to form the shell portion 20, volume changes of the primary particles 30 during charging and discharging may be effectively accommodated. Thus, the occurrence of cracks in the secondary particles 200 due to volume changes thereof during charging and discharging may be suppressed or reduced.

Referring to FIGS. 2A and 2B, the shell portion 20 refers to an area corresponding to about 30% to about 50%, for example, about 40% of the length from the outermost portion of the particulate structure 100, with respect to a total distance between the center and a surface of the particulate structure 100 (e.g., the outer 30% to 50% length of the radius). For example, the shell may encompass the volume or area within about 2 μm from the surface of the particulate structure 100. The porous core portion 10 refers to an area corresponding to about 50% to about 70%, for example, about 60% of the length from the center of the particulate structure 100, with respect to a total distance between the center and the outermost portion of the particulate structure 100 (e.g., the inner 50% to 70% of the radius). For example, the core may encompass the remaining area or volume excluded from the shell area within 2 μm from the surface of the particulate structure 100. The center of the particulate structure 100 is, for example, a geometrical center of the particulate structure 100. Although FIGS. 2A and 2B illustrate embodiments in which the particulate structure 100 is completely spherical, the particulate structure 100 may be spherical or non-spherical without being limited thereto. The particulate structure 100 may have a non-spherical shape, and may have one or more of any suitable form (such as elliptical, cubic, and rectangular parallelepiped forms), but embodiments of the present disclosure are not limited thereto. Referring to FIGS. 2A and 2B, the particulate structure 100 has a substantially spherical form, but in the secondary particle 200 of FIG. 1 obtained by assembly of a plurality of particulate structures 100, the particulate structures 100 overlap with each other, and thus may have a partial (non-spherical) particle shape.

Figure 3:
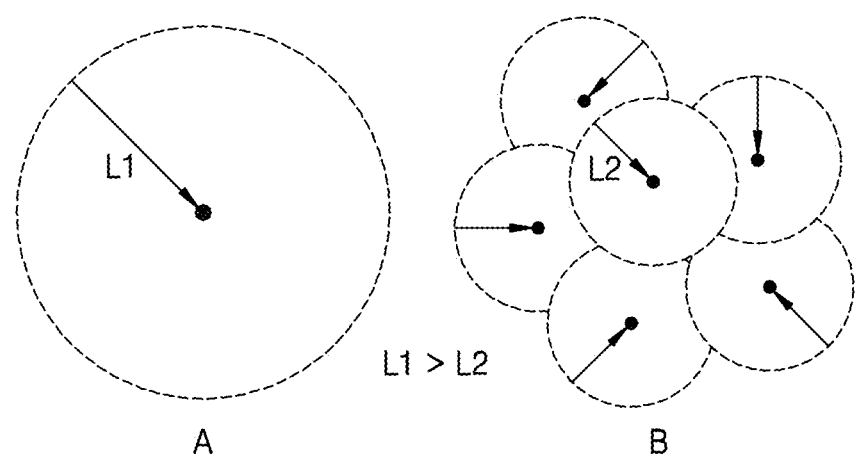
FIG. 3 is a schematic view illustrating comparative lithium ion transfer distances between nickel-based active material B according to an embodiment of the present disclosure and general (related art) nickel-based active material A.

Referring to FIGS. 1, 2A, and 2B, the secondary particle 200 has multi-centers (a plurality of radial centers), and includes a plurality of particulate structures 100 that are isotropically arranged (e.g., within the secondary particle). Here, the terms "multi-center" and "plurality of radial centers" may be interchangeably used. Since the secondary particle 200 includes the particulate structures 100 and each particulate structure 100 includes the porous core portion 10 corresponding to the center of the particulate structure 100, the secondary particle 200 has multi-centers. Thus, in a nickel-based active material obtained from the nickel-based active material precursor, lithium ion transfer paths from each of the centers of the secondary particle 200 to the surface of the secondary particle 200 are shortened. Consequently, lithium ions are more readily used (available) in a nickel-based active material obtained from the nickel-based active material precursor according to embodiments of the present disclosure. In addition, in a nickel-based active material obtained from the nickel-based active material precursor, since the particulate structures 100 included in the secondary particle 200 are isotropically arranged without a set or predetermined orientation, uniform use of lithium ions is possible irrespective of a specific direction in which the secondary particles 200 are arranged. As illustrated in FIG. 3, in a nickel-based active material obtained from the nickel-based active material precursor, in the case of a secondary particle A having a single particulate structure, a first transfer distance L1 of lithium ions corresponds to a radius of the secondary particle A, but in the case of a secondary particle B having a plurality of particulate structures, a second transfer distance L2 of lithium ions corresponds to a radius of each particulate structure, and thus the second transfer distance L2 is smaller than the first transfer distance L1. Thus, in the nickel-based active material obtained from the nickel-based active material precursor, lithium ions are more readily used without increasing the content of nickel, resulting in increased discharge capacity.

Referring to FIGS. 1, 2A, and 2B, major axes 31 of primary particles 30 at the surface of the secondary particle 200 may be normal to a surface (e.g., the outer surface) of the secondary particle 200. For example, a (100) plane or a (110) plane of the primary particle 30 may be oriented normal to the outer surface of the secondary particle 200, for example, co-planar with major axes 31 of the primary particles at the surface of the second particle 200. In some embodiments, the major axes 31 of 50% or more, about 50% to about 90%, about 60% to about 90%, or about 70% to about 80% of the primary particles at the surface of the secondary particle 200 may be aligned normal to a surface of the secondary particle. For example, in the 50% or more, about 50% to about 90%, about 60% to about 90%, or about 70% to about 80% of primary particles at the surface of the secondary particle 200, major axes 31 of the primary particles constituting a surface of the second particle 200 may be disposed in a normal direction of the (100) plane or the (110) plane of the primary particles at an outer surface of the secondary particle. When the major axes 31 of the primary particles at the surface of the secondary particle 200 are aligned normal of a surface of the secondary particle 200, e.g., when the major axes 31 of the primary particles at the surface of the secondary particle 200 are disposed in a normal direction of the (100) plane or the (110) plane of the primary particles at the surface of the secondary particle 200, or when the major axes 31 of the primary particles at the surface of the secondary particle 200 align with the [100] direction or the [110] direction in the particle crystal structures, lithium diffusion may be facilitated at an interface between the nickel-based active material and an electrolytic solution, and diffusion of lithium ions into the nickel-based active material is also facilitated. Accordingly, in a nickel-based active material obtained from the nickel-based active material precursor including (e.g., consisting of) the secondary particles 200, the use of lithium ions is further facilitated.

Referring to FIG. 1, the secondary particle 200 may be spherical or non-spherical, for example, according to an assembled form of the particulate structures 100. In some embodiments, the secondary particle 200 may have a sphericity of about 0.850 to about 0.980, or about 0.880 to about 0.950. When the nickel-based active material precursor and the nickel-based active material obtained therefrom have sphericities within the above-described ranges, the use of lithium ions (e.g., increased capacity) may be further facilitated.

Referring to FIG. 2B, in an example embodiment, the primary particle 30 is a non-spherical particle having a minor axis and a major axis. The minor axis is an axis along the smallest dimension of the primary particle 30, and the major axis is an axis along the largest dimension of the primary particle 30. A ratio of the minor axis to the major axis of the primary particle 30 may be, for example, about 1:2 to about 1:20, about 1:3 to about 1:20, or about 1:5 to about 1:15. When the primary particle 30 has a ratio of a minor axis to a major axis within the above-described range, the use of lithium ions may be further facilitated in a nickel-based active material obtained from the nickel-based active material precursor.

Referring to FIG. 2B, the primary particles 30, which are non-spherical particles, may include, for example, plate particles. Plate particles are particles having two opposing surfaces apart from each other, wherein the surfaces have a surface length greater than the distance between the two surfaces (e.g., the thickness of the particle). The length of a surface of a plate particle is the larger of the two lengths defining the surface of the plate particle. The two lengths defining the surface may be different from or the same as each other, and are each greater than the thickness of the plate particle. The thickness of the plate particle is the length of a minor axis of the plate particle, and the length of the surface of the plate particle is the length of a major axis of the plate particle. The surfaces of plate particles may be in the form of a polyhedron (such as a trihedron (triangle), a tetrahedron (square or rectangle), a pentahedron (pentagon), a hexahedron (hexagon), or the like), a circular (disk) shape, or an elliptical shape, and any suitable shape in the art, without limitation. Non-limiting examples of the plate particles include nano-discs, tetragonal nano-sheets, pentagonal nano-sheets, and hexagonal nano-sheets. The forms of the plate particles may vary depending on the conditions under which the secondary particles are prepared. The two opposing surfaces of the plate particle may not be parallel to each other, an angle between a surface and a side surface may be variously changed, edges of the surface and the side surface may have a rounded shape, and/or each of the surface and the side surface may have a planar or curved shape. The major axes of the plate particles are radially arranged on the porous core portion 10 of the particulate structure 100, thereby forming the shell portion 20. A length ratio of the minor axis to the major axis of the plate particle may be, for example, about 1:2 to about 1:20, about 1:3 to about 1:20, or about 1:5 to about 1:15. In an example embodiment, the plate particles may have an average thickness of about 100 nm to about 250 nm, or about 100 nm to about 200 nm, and may have an average surface length of about 250 nm to about 1,100 nm, or about 300 nm to about 1,000 nm. The average surface length of the plate particles is about 2 times to about 10 times the average thickness. When the plate particles have a thickness, an average surface length, and a ratio thereof within the above-described ranges, radial arrangement of the plate particles on a porous core portion may be facilitated and consequently, the use of lithium ions may be further facilitated in a nickel-based active material obtained from the nickel-based active material precursor.

Referring to FIG. 1, in the nickel-based active material precursor, the secondary particle 200 may have a size of, for example, about 5 μm to about 25 μm, or about 8 μm to about 20 μm. Since the secondary particle 200 has a size within the above range, the use of lithium ions is further facilitated in the nickel-based active material. Referring to FIGS. 1, 2A, and 2B, in the nickel-based active material precursor, the particulate structure 100 has a size of, for example, about 2 μm to about 7 μm, about 3 μm to about 6 μm, about 3 μm to about 5 μm, or about 3 μm to about 4 μm. When the particulate structure 100 has a size within the above-described range, it is easier to form an isotropic arrangement during assembly of a plurality of particulate structures 100, and the use of lithium ions is further facilitated in a nickel-based active material obtained from the nickel-based active material precursor.

Referring to FIGS. 2A and 2B, the size of pores in the porous core portion 10 included in the particulate structure 100 may be about 150 nm to about 1 μm, about 150 nm to about 550 nm, or about 200 nm to about 800 nm. In addition, the size of pores in the shell portion 20 included in the particulate structure 100 may be less than 150 nm, 100 nm or less, or about 20 nm to about 90 nm. The porous core portion 10 included in the particulate structure 100 may have a porosity of about 5% to about 15%, or about 5% to about 10%. In addition, the shell portion 20 included in the particulate structure 100 may have a porosity of about 1% to about 5%, or about 1% to about 3%. When the particulate structure 100 has pore size and porosity within the above-described ranges, a nickel-based active material obtained from the nickel-based active material precursor has excellent capacity characteristics. In an example embodiment, in the particulate structure 100, the porosity of the shell portion 20 is controlled to be smaller than the porosity of the porous core portion 10. For example, the pore size and porosity of the porous core portion 10 are greater than those of the shell portion 20 and are irregularly controlled (e.g., irregular in shape and size). When the porosity of the porous core portion 10 and the shell portion 20 of the particulate structure 100 satisfy the above-described ranges and relationship, the density of the shell portion 20 may be increased compared to the porous core portion 10, and a side reaction between the particulate structure 100 and an electrolytic solution may be effectively suppressed or reduced. The size of pores and the porosity of particles can be measured using any suitable method, for example, by a gas adsorption method.

According to an example embodiment, in the particulate structure 100, closed pores may be present in the porous core portion 10 and closed pores and/or open pores may be present in the shell portion 20. While it is difficult for closed pores to include an electrolyte and/or the like, open pores may enable an electrolyte and/or the like to be included in pores of the particulate structure 100. In addition, irregular (e.g., irregularly shaped) pores may be present in the porous core portion 10 of the particulate structure 100. Like the shell portion 20, the porous core portion 10 including an irregular porous structure includes plate particles, and the plate particles of the porous core portion 10 may be irregularly arranged unlike the shell portion 20.

The nickel-based active material precursor may be a compound represented by Formula 1:

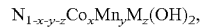

Formula 1 wherein, in Formula 1, M is an element selected from the group consisting of boron (B), magnesium (Mg), calcium (Ca), strontium (Sr), barium (Ba), titanium (Ti), vanadium (V), chromium (Cr), iron (Fe), copper (Cu), zirconium (Zr), tungsten (W), and aluminum (Al), $x \leq (1-x-y-z)$, $y \leq (1-x-y-z)$, $0<x<1$, $0 \leq y<1$, $0 \leq z<1$, and $0<1-x-y-z<1$. As such, in the nickel-based active material precursor of Formula 1, the content of nickel is the same as or greater than the content of cobalt, and the content of nickel is the same as or greater than the content of manganese. In Formula 1, $0<x\leq\frac{1}{3}$, $0\leq y\leq 0.5$, $0\leq z\leq 0.05$, and $\frac{1}{3}\leq(1-x-y-z)<0.95$. According to one embodiment, x may be 0.1 to 0.3, y may be 0.05 to 0.3, and z may be 0.

The nickel-based active material precursor may be, for example, $Ni_{0.6}Co_{0.2}Mn_{0.2}(OH)_2$, $Ni_{0.7}Co_{0.15}Mn_{0.15}(OH)_2$, $Ni_{0.7}Co_{0.1}Mn_{0.2}(OH)_2$, $Ni_{0.5}Co_{0.2}Mn_{0.3}(OH)_2$, $Ni_{1/3}Co_{1/3}Mn_{1/3}(OH)_2$, $Ni_{0.8}Co_{0.1}Mn_{0.1}(OH)_2$, or $Ni_{0.85}Co_{0.1}Al_{0.05}(OH)_2$.

According to another embodiment, a method of preparing a nickel-based active material precursor includes: a first act of supplying raw materials at a first feed rate and stirring the raw materials to form a precursor seed; a second act of supplying raw materials to the precursor seed formed by the first act at a second feed rate and stirring the raw materials to grow the precursor seed; and a third act of supplying raw materials to the precursor seed grown by the second act at a third feed rate and stirring the raw materials to control the growth of the precursor seed, in which the raw materials include a complexing agent, a pH adjuster, and a metal-containing raw material for forming a nickel-based active material precursor, the second feed rate of the metal containing raw material is higher than the first feed rate of the metal containing raw material, and the third feed rate of the metal containing raw material is higher than the second feed rate of the metal containing raw material.

In the first act, the second act, and the third act, as the feed rate of the metal-containing raw material is sequentially increased, a nickel-based active material precursor having the above-described novel structure is obtained. In the first act, the second act, and the third act, respectively, a reaction temperature is in a range of about 40° C. to about 60° C., a stirring power is in a range of about 0.5 kW/m³ to about 6.0 kW/m³, pH is in a range of about 10 to about 12, and the amount of the complexing agent included in a reaction mixture is in a range of about 0.3 M to about 0.6 M, for example, in a range of about 0.35 M to about 0.45 M. Within the above-described ranges, a nickel-based active material precursor that more satisfactorily matches the above-described structure may be obtained. The stirring power is proportional to a stirring rate.

In the first act, pH is controlled while a metal-containing raw material and a complexing agent are added, at a constant rate, to a reactor including an aqueous solution including a complexing agent and/or a pH adjuster, thereby forming and growing a precursor seed. In the first act, precursor particles have a growth rate of about 0.30±0.05 μm/hr. In the first act, the stirring power of the reaction mixture may be about 1.5 kW/m³ to about 4 kW/m³, for example, 3.0 kW/m³, and the pH may be about 10.0 to about 12.0. For example, in the first act, the feed rate of the metal-containing raw material may be greater than about 0 L/hr to about 10.0 L/hr, for example, 5.0 L/hr, and the feed rate of the complexing agent may be about 0.1 times to about 0.6 times, for example, about 0.12 times a feed rate of the metal-containing raw material. The temperature of the reaction mixture may be about 40° C. to about 60° C., for example, 50° C., and the pH of the reaction mixture may be about 10.5 to about 11.50.

In the second act, reaction conditions are changed to further grow the precursor seed formed by the first act. The growth rate of the precursor seed in the second act may be the same as or increased by 20% or more compared to the growth rate of the precursor seed in the first act. The feed rate of the metal-containing raw material in the second act may be 1.2 times or more, for example, about 1.2 times to about 2.5 times the feed rate of the metal-containing raw material in the first act, and the concentration of the complexing agent in the reaction mixture may be increased by 0.05 M or more, for example, about 0.05 M to about 0.15 M with respect to the concentration of the complexing agent in the first act. In the second act, the stirring power of the reaction mixture may be about 1 kW/m³ to about 3 kW/m³, or about 2.5 kW/m³, and the pH of the reaction mixture may be about 10.5 to about 11.0. Precursor particles obtained in the second act may have a mean particle diameter (D50) of about 9 μm to about 12 μm, for example, about 10 μm.

In the third act, the growth rate of precursor seed particles is adjusted, thereby obtaining a nickel-based active material precursor for a lithium secondary battery. When the mean particle diameter (D50) of the precursor particles in the second act reaches about 9 μm to about 12 μm, for example, about 10 μm, the third act begins. The growth rate of the precursor particles in the third act may be increased 2 times or more, for example, 3 times or more that of the precursor particles in the second act. To this end, the reaction product inside the reactor, which has undergone the second act, may be partially removed to dilute the concentration of the reaction product in the reactor. The product removed from the inside of the reactor may be used in other reactors. The feed rate of the metal-containing raw material in the third act may be 1.1 times or more, for example, about 1.1 times to about 1.5 times the feed rate of the metal-containing raw material in the second act, and the concentration of the complexing agent in the reaction mixture may be the same as the concentration of the complexing agent in the second act, or may be increased by 0.05 M or more, for example, about 0.05 M to about 0.15 M with respect to the concentration of the complexing agent in the second act. In the third act, a precipitate is rapidly grown to thereby obtain a nickel-based active material precursor. In the third act, the stirring power (rate) of the reaction mixture may be about 0.5 kW/m³ to about 2 kW/m³, or 1 kW/m³, and the reaction mixture may have a pH of about 10.5 to about 11.

In the precursor preparation method, the feed rate of the metal-containing raw material may be sequentially increased from the first act to the second act to the third act. For example, the feed rate of the metal-containing raw material in the second act may be increased by about 10% to about 50% with respect to the feed rate of the metal-containing raw material in the first act, and the feed rate of the metal-containing raw material in the third act may be increased by about 10% to about 50% with respect to the feed rate in the second act. As such, by gradually increasing the feed rate of the metal-containing raw material, a nickel-based active material precursor that more satisfactorily matches the above-described structure may be obtained.

In the precursor preparation method, as the metal-containing raw material, a metal precursor corresponding thereto may be used in consideration of the composition of the nickel-based active material precursor. Non-limiting examples of the metal-containing raw material include metal carbonates, metal sulfates, metal nitrates, metal chlorides, and metal fluorides, and any metal precursor that may be used in the art is possible. For example, as a nickel (Ni)-containing compound, at least one selected from the group consisting of nickel (II) sulfate, nickel (II) nitrate, nickel (II) chloride, and nickel (II) fluoride may be used. For example, as a metal (M)-containing compound, at least one selected from the group consisting of manganese (II) sulfate, manganese (II) nitrate, manganese (II) chloride, manganese (II) fluoride, cobalt (II) sulfate, cobalt (II) nitrate, cobalt (II)

chloride, and cobalt (II) fluoride may be used. The above materials may anhydrous, or may be added as any suitable hydrate.

In the precursor preparation method, as the first act, the second act, and the third act proceed, the stirring power of the reaction mixture in a reactor may be sequentially reduced. In the first act, the stirring power may be about 1.5 kW/m³ to about 4 kW/m³, the stirring power in the second act may be about 1 kW/m³ to about 3 kW/m³, and the stirring power in the third act may be about 0.5 kW/m³ to about 2 kW/m³. As such, by gradually reducing the stirring power, a nickel-based active material precursor that more satisfactorily matches the above-described structure may be obtained. In addition, in the precursor preparation method, as the first act, the second act, and the third act proceed, the stirring rate of the reaction mixture in the reactor may be sequentially reduced. As such, by gradually reducing the stirring rate, a nickel-based active material precursor that more satisfactorily matches the above-described structure may be obtained.

In the precursor preparation method, as the first act, the second act, and the third act proceed, the pH of the reaction mixture in the reactor may be maintained or sequentially reduced. For example, the pH of the reaction mixture in the first to third acts may be in a range of about 10.0 to about 11.50 at a reaction temperature of 50° C. For example, when the reaction temperature is 50° C., the pH of the reaction mixture in the third act may be the same as the pH of the reaction mixture in the first act, or may be about 0.5 to about 1.5, or about 0.5 to about 1.0 lower than the pH of the reaction mixture in the first act. For example, at a reaction temperature of 50° C., the pH of the reaction mixture in the second act may be the same as the pH of the reaction mixture in the first act or about 0.5 to about 1.0 lower than the pH of the reaction mixture in the first act, and the pH of the reaction mixture in the third act may be the same as the pH of the reaction mixture in the second act or may be about 0.35 to about 0.55 lower than the pH of the reaction mixture in the second act. As such, by maintaining or gradually reducing the pH of the reaction mixture, a nickel-based active material precursor that more satisfactorily matches the above-described structure may be obtained.

In the precursor preparation method, the concentration of the complexing agent included in the reaction mixture of the second act may be maintained or increased with respect to the concentration of the complexing agent included in the reaction mixture of the first act, and the concentration of the complexing agent included in the reaction mixture of the third act may be maintained or increased with respect to the concentration of the complexing agent included in the reaction mixture of the second act.

To control the growth rate of nickel-based active material precursor particles, the amount of a metal-containing raw material added to grow the particles may be increased by about 15% to about 35%, for example, about 25% in the second act compared to the first act, and may be increased by about 20% to about 35%, for example, about 33% in the third act compared to the second act. In addition, the feed rate of complexing agent (e.g., ammonia water) in the second act may be increased by about 10% to about 30%, for example, about 20% with respect to the feed rate of complexing agent (e.g., ammonia water) in the first act, thereby increasing the density of the particles.

The pH adjuster serves to lower the solubility of metal ions inside a reactor to precipitate the metal ions into a hydroxide. The pH adjuster may be, for example, sodium hydroxide (NaOH), sodium carbonate ($Na_2CO_3$), and/or the like. In some embodiments, the pH adjuster is, for example, NaOH.

The complexing agent controls the precipitation rate in a co-precipitation reaction. The complexing agent may be ammonium hydroxide ($NH_4OH$) (ammonia water), citric acid, acrylic acid, tartaric acid, glycolic acid, and/or the like. Any suitable amount of the complexing agent may be used. The complexing agent may be, for example, ammonia water.

A nickel-based active material according to another embodiment of the present disclosure is obtained from the above-described nickel-based active material precursor. The nickel-based active material may be, for example, a compound represented by Formula 2:

$$Li_a(Ni_{1-x-y-z}Co_xMn_yM_z)O_2,$$  Formula 2

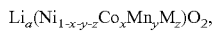

wherein, in Formula 2, M is an element selected from the group consisting of B, Mg, Ca, Sr, Ba, Ti, W, V, Cr, Fe, Cu, Zr, and Al, $1.0 \le a \le 1.3$, $x \le (1-x-y-z)$, $y \le (1-x-y-z)$, $0<x<1$, $0 \le y<1$, $0 \le z<1$, and $0<1-x-y-z<1$.

In the compound of Formula 2, the content of nickel is greater than the content of cobalt and is greater than the content of manganese. In Formula 2, $1.0 \le a \le 1.3$, $0 \le x \le 1/3$, $0 \le y \le 0.5$, $0 \le z \le 0.05$, and $1/3 \le (1-x-y-z) \le 0.95$.

In Formula 2, a may be, for example, 1 to 1.1, x may be 0.1 to 0.3, y may be 0.05 to 0.3, and z may be 0.

In the nickel-based active material, for example, the content of nickel may be about 33 mol % to about 95 mol %, for example, about 50 mol % to about 90 mol %, for example, about 60 mol % to about 85 mol %, with respect to a total amount of transition metals. The term "total amount of transition metals" refers to a total amount of nickel, cobalt, manganese, and M in Formula 2.

The nickel-based active material may be, for example, $LiNi_{0.6}Co_{0.2}Mn_{0.2}O_2$, $LiNi_{0.7}Co_{0.15}Mn_{0.15}O_2$, $LiNi_{0.7}Co_{0.1}Mn_{0.2}O_2$, $LiNi_{0.5}Co_{0.2}Mn_{0.3}O_2$, $LiNi_{1/3}Co_{1/3}Mn_{1/3}O_2$, $LiNi_{0.8}Co_{0.1}Mn_{0.1}O_2$, or $LiNi_{0.85}Co_{0.1}Al_{0.05}O_2$.

The nickel-based active material may have a particle structure and/or characteristics substantially the same as or similar to those of the above-described nickel-based active material precursor, except that lithium is arranged (present or included) in the crystal structure, and the hydroxide is changed to an oxide.

A secondary particle included in the nickel-based active material has multi-centers and includes a plurality of isotropically arranged particulate structures, and thus a transfer distance of lithium ions and electrons from a surface to a center portion of the secondary particle is shortened, and accordingly, intercalation and deintercalation of lithium ions are facilitated and electron transfer of electrons is facilitated. In addition, since the particulate structure included in the nickel-based active material includes a porous core portion and primary particles radially arranged on the porous core portion, volume changes of the nickel-based active material during charging and discharging can be effectively accommodated, and thus stress of the nickel-based active material may be reduced. Accordingly, a nickel-based active material obtained from the above-described nickel-based active material precursor may exhibit a higher capacity without increasing the content of nickel.

A method of preparing a nickel-based active material from the nickel-based active material precursor is not particularly limited, and may be, for example, a dry process.

The nickel-based active material may be prepared by, for example, mixing a lithium precursor and a nickel-based active material precursor in a suitable molar ratio and primary heat-treating (low-temperature heat treatment) the resulting mixture at a temperature of about 600° C. to about 800° C.

The lithium precursor may be, for example, lithium hydroxide, lithium fluoride, lithium carbonate, or a mixture thereof. A mixing ratio of the lithium precursor to the nickel-based active material precursor may be adjusted stoichiometrically, for example, to prepare the nickel-based active material of Formula 2.

The mixing process may be dry mixing, and may be performed using a mixer or the like. In some embodiments, the dry mixing process may be performed using a mill. Milling conditions are not particularly limited, but milling may be carried out so that that the precursor used as a starting material undergoes limited deformation (such as pulverization and/or the like). The size of the lithium precursor to be mixed with the nickel-based active material precursor may be suitably selected. The size (mean particle diameter) of the lithium precursor may be about 5 μm to about 15 μm, for example, about 10 μm. By performing milling on the lithium precursor having a size within this range in the presence of the nickel-based active material precursor at about 300 rpm to about 3,000 rpm, a suitable mixture may be obtained. In the milling process, when an internal temperature of a mixer is increased by 30° C. or more, a cooling process may be performed such that the internal temperature of the mixture is maintained at room temperature (25° C.).

The low-temperature heat treatment (primary heat-treatment) may be performed in an oxidative gas atmosphere. The oxidative gas atmosphere may include an oxidative gas such as oxygen or air, and the oxidative gas may include, for example, about 10 vol % to about 20 vol % of oxygen or air and about 80 vol % to about 90 vol % of inert gas. The low-temperature heat treatment may be performed at a densification temperature or less as a reaction between the lithium precursor and the nickel-based active material precursor proceeds. "Densification temperature" refers to a temperature at which sufficient crystallization occurs to thereby realize a charging capacity that the active material is capable of providing. The low-temperature heat treatment is performed at a temperature of, for example, about 600° C. to about 800° C., for example, about 650° C. to about 800° C. The low-temperature heat treatment time may vary depending on the heat treatment temperature, but is, for example, about 3 hours to about 10 hours.

The method of preparing a nickel-based active material may further include, after the low-temperature heat treatment, a second (secondary) heat treatment (high-temperature heat treatment) process performed in an oxidative gas atmosphere while suppressing exhaust generated within the reactor. The high-temperature heat treatment may be performed at a temperature of, for example, about 700° C. to about 900° C. The high-temperature heat treatment time may vary depending on the high-temperature heat treatment temperature, but may be, for example, about 3 hours to about 10 hours.

According to another embodiment, a lithium secondary battery includes a positive electrode including the above-described nickel-based active material for a lithium secondary battery, a negative electrode, and an electrolyte arranged therebetween.

A method of manufacturing a lithium secondary battery is not particularly limited, and any suitable method used in the art may be used. The lithium secondary battery may be manufactured by, for example, the following method.

A positive electrode and a negative electrode may be respectively fabricated by applying a composition for forming a positive active material layer and a composition for forming a negative active material layer on respective current collectors, and drying the resulting structures.

The composition for forming a positive active material layer may be prepared by mixing a positive active material, a conductive agent, a binder, and a solvent. The positive active material according to embodiments of the present disclosure is used therein.

The binder may assist in binding between an active material, a conductive agent, and a current collector, and may be added in an amount of about 0.5 part by weight to about 50 parts by weight of 100 parts by weight of a total amount of the positive active material. Non-limiting examples of the binder may include polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, ethylene-propylene-diene terpolymer (EPDM), sulfonated EPDM, styrene-butadiene rubber, fluorine rubber, and various suitable copolymers.

The conductive agent may be added in an amount of about 0.5 part by weight to about 50 parts by weight of 100 parts by weight of a total amount of the positive active material. The conductive agent is not particularly limited as long as it does not cause an unwanted chemical change (reaction) in the fabricated battery and has conductivity. Non-limiting examples thereof include graphite (such as natural graphite and/or artificial graphite); carbonaceous materials (such as carbon black, acetylene black, Ketjenblack, channel black, furnace black, lamp black, and/or thermal black); conductive fibers (such as carbon fibers and/or metallic fibers); conductive powder (such as carbon fluoride powder); metal powder (such as aluminum powder and/or nickel powder); conductive whiskers (such as zinc oxide and/or potassium titanate); conductive metal oxides (such as titanium oxide); and conductive polymers (such as polyphenylene derivatives).

The amount of the solvent is about 10 part by weight to about 300 parts by weight with respect to 100 parts by weight of the total weight of the positive active material. When the amount of the solvent is within the above range, formation of a positive active material layer may be more facilitated. As a non-limiting example of the solvent, N-methylpyrrolidone and/or the like may be used.

The amounts of the binder, the conductive agent, and the solvent are not limited and may be suitable to those in the related art.

A positive electrode current collector may have a thickness of about 3 μm to about 500 μm, and is not particularly limited as long as it has high conductivity without causing an unwanted chemical change (reaction) in the fabricated battery. Non-limiting examples of the positive electrode current collector include stainless steel, aluminum, nickel, titanium, sintered carbon, and aluminum or stainless steel that is surface-treated with carbon, nickel, titanium, silver, and/or the like. The current collector may be processed to have fine irregularities on its the surfaces so as to enhance adhesion of the current collector to the positive active material, and may be used in any suitable form (including films, sheets, foils, nets, porous structures, foams, and non-woven fabrics).

Separately, the composition for forming a negative active material layer may be prepared by mixing a negative active material, a binder, a conductive agent, and a solvent. A material capable of intercalating and deintercalating lithium ions is used as the negative active material. As a non-limiting example of the negative active material, graphite, a carbonaceous material (such as carbon), Li metal or an alloy thereof, or a silicon oxide-based material may be used.

The binder may be added in an amount of about 0.5 part by weight to about 50 parts by weight with respect to 100 parts by weight of a total weight of the negative active material. As a non-limiting example, the binder may be the same binder as that of the positive electrode.

The conductive agent may be used in an amount of about 0 part by weight to about 5 parts by weight with respect to 100 parts by weight of the total weight of the negative active material. When the amount of the conductive agent is within the above-described range, the finally obtained electrode has excellent conductivity. For example, the conductive agent may be omitted in the negative active material layer when a graphite having a good conductivity is used as an anode active material.

The amount of the solvent is about 10 part by weight to about 300 parts by weight with respect to 100 parts by weight of the total weight of the negative active material. When the amount of the solvent is within the above range, formation of a negative active material layer may be facilitated. As a non-limiting example of the solvent, water, N-methylpyrrolidone and/or the like may be used.

The same conductive agent and solvent used in fabricating the positive electrode may be used in fabricating the negative electrode.

The negative electrode current collector may have a thickness of about 3 μm to about 500 μm. The negative electrode current collector is not particularly limited as long as it has conductivity without causing an unwanted chemical change (reaction) in the fabricated battery, and non-limiting examples of the negative electrode current collector include copper, stainless steel, aluminum, nickel, titanium, sintered carbon, copper or stainless steel that is surface-treated with carbon, nickel, titanium, or silver, and aluminum-cadmium alloys. In addition, as in the positive electrode current collector, the current collector may be processed to have fine irregularities on its surfaces so as to enhance adhesion of the current collector to the negative active material, and may be used in any suitable form (including films, sheets, foils, nets, porous structures, foams, and non-woven fabrics).

A separator is positioned between the positive and negative electrodes fabricated by the above-described processes. The separator may have a pore diameter of about 0.01 μm to about 10 μm and generally has a thickness of about 5 μm to about 300 μm. For example, the separator may be an olefin-based polymer (such as polypropylene, polyethylene, and/or the like); or a sheet or non-woven fabric made of glass fiber; or the like. When a solid electrolyte such as a polymer or the like is used as an electrolyte, the solid electrolyte may also act as a separator.

A lithium salt-containing non-aqueous electrolyte includes (e.g., consists of) a non-aqueous electrolyte and a lithium salt. As the non-aqueous electrolyte, a non-aqueous electrolytic solution, an organic solid electrolyte, or an inorganic solid electrolyte may be used.

As the non-aqueous electrolytic solvent, an aprotic organic solvent may be used, for example, N-methyl-2-pyrrolidone, propylene carbonate, ethylene carbonate, butylene carbonate, dimethyl carbonate, diethyl carbonate, γ-butyrolactone, 1,2-dimethoxy ethane, 2-methyl tetrahydrofuran, dimethylsulfoxide, 1,3-dioxolane, formamide, N,N-dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate, but embodiments of the present disclosure are not limited thereto.

Non-limiting examples of the organic solid electrolyte include polyethylene derivatives, polyethylene oxide derivatives, polypropylene oxide derivatives, phosphoric acid ester polymers, polyester sulfide, polyvinyl alcohol, and polyvinylidene fluoride. Non-limiting examples of the inorganic solid electrolyte includes $Li_3N$, $LiI$, $Li_5NI_2$, $Li_3N$—$LiI$—$LiOH$, $Li_2SiS_3$, $Li_4SiO_4$, $Li_4SiO_4$—$LiI$—$LiOH$, and $Li_3PO_4$—$Li_2S$—$SiS_2$.

The lithium salt is a material that is readily soluble in the non-aqueous electrolyte, and non-limiting examples of the lithium salt include $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, $(FSO_2)_2NLi$, lithium chloroborate, lower aliphatic carboxylic acid lithium, lithium tetraphenyl borate, and lithium imide.

Figure 4:
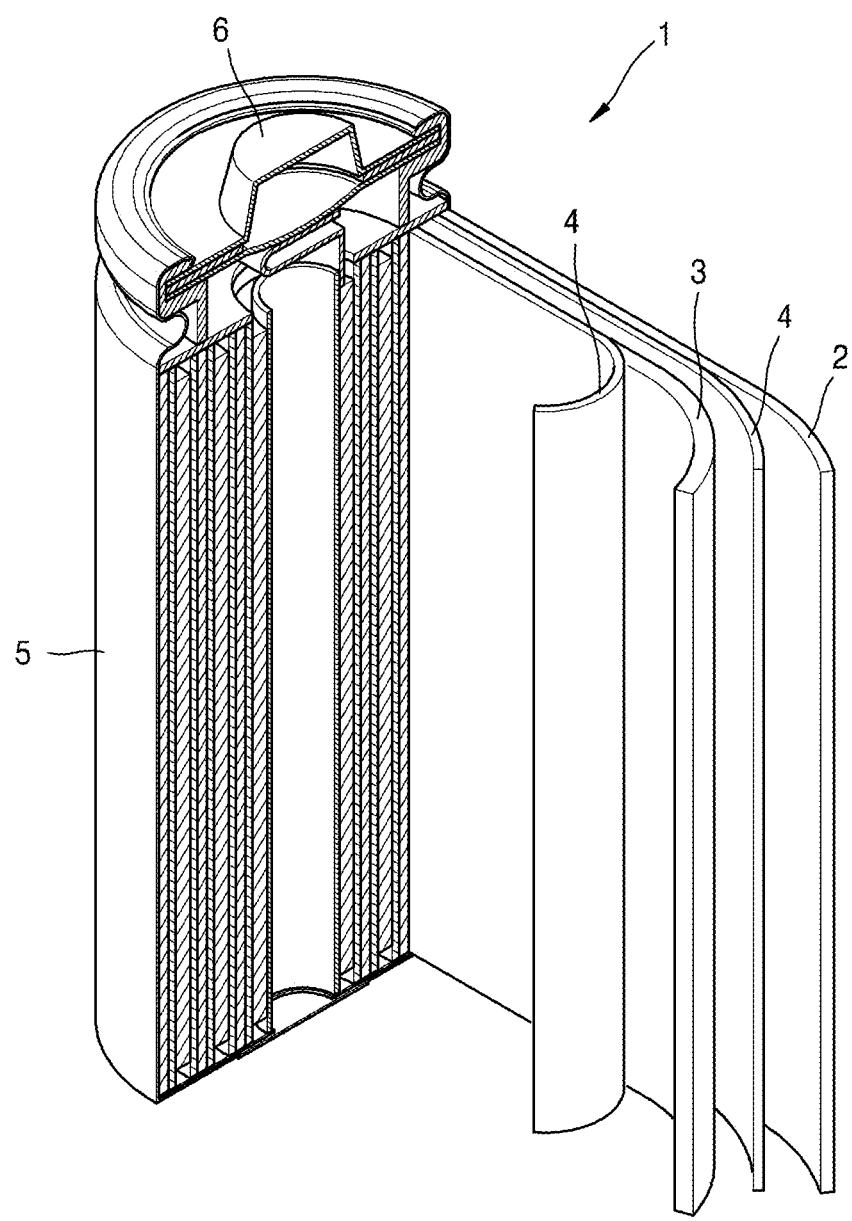
FIG. 4 is a view of a lithium secondary battery according to an example embodiment of the present disclosure.

FIG. 4 is a schematic cross-sectional view illustrating a structure of a lithium secondary battery 1 according to an embodiment of the present disclosure.

Referring to FIG. 4, the lithium secondary battery 1 includes a positive electrode 3, a negative electrode 2, and a separator 4. The positive electrode 3, the negative electrode 2, and the separator 4 are wound or folded, and then accommodated in a battery case 5. Subsequently, an organic electrolytic solution is injected into the battery case 5 and the battery case 5 is sealed by a cap assembly 6, thereby completing the manufacture of the lithium secondary battery 1. The battery case 5 may have a cylindrical shape, a rectangular shape or a thin-film shape. For example, the lithium secondary battery 1 may be a large-sized thin film-type (format) battery. The lithium secondary battery 1 may be a lithium ion battery.

A separator may be placed between a positive electrode and a negative electrode to thereby form a battery assembly. The battery assembly may be stacked in a bi-cell structure, and impregnated with an organic electrolytic solution, and the resulting structure is accommodated in a pouch and hermetically sealed, thereby completing the manufacture of a lithium ion polymer battery. In addition, a plurality of battery assemblies may be stacked to form a battery pack, and the battery pack may be used in any device requiring high capacity and high-power output. For example, the battery pack may be used in notebook computers, smartphones, electric vehicles, and the like. In addition, the lithium secondary battery may be used in electric vehicles (EVs) due to excellent storage stability at high temperatures, excellent lifespan characteristics, and excellent rate capability. For example, the lithium secondary battery may be used in hybrid vehicles such as plug-in hybrid electric vehicles (PHEVs).

Hereinafter, the present disclosure will be described in further detail with reference to the following examples and comparative examples. However, these examples are provided for illustrative purposes only and are not intended to limit the scope of the present disclosure.

Preparation Example 1: Preparation of Nickel-Based Active Material Precursor (6:2:2): Three-Act Method A nickel-based active material precursor ($Ni_{0.6}Co_{0.2}Mn_{0.2}(OH)_2$) was synthesized through co-precipitation. In the following preparation process, nickel (II) sulfate hexahydrate ($NiSO_4 \cdot 6H_2O$), cobalt (II) sulfate heptahydrate ($CoSO_4 \cdot 7H_2O$), and manganese (II) sulfate monohydrate ($MnSO_4 \cdot H_2O$), as metal-containing raw materials for forming a nickel-based active material precursor, were dissolved in distilled water as a solvent in a molar ratio of 6:2:2 to prepare a mixed solution. In addition, to form a complex compound, ammonia water ($NH_4OH$) and sodium hydroxide (NaOH) were prepared as a precipitant.

First Act: Feed Rate of 5.0 L/hr, Stirring Power of 1.5 $kW/m^3$, $NH_4OH$ 0.35 M, pH of 10.5 to 11.0

Ammonia water was added at a concentration of 0.35 mol/L (M) to a reactor equipped with a stirrer. While a stirring power of 1.5 $kW/m^3$ and a reaction temperature of 50° C. were maintained, 2 mol/L (M) of metal-containing raw materials (a mixed solution of nickel sulfate, cobalt sulfate, and manganese sulfate) and 0.35 mol/L (M) of ammonia water were concurrently or simultaneously added at feed rates of 5.0 L/hr and 0.53 L/hr, respectively. Subsequently, sodium hydroxide (NaOH) was added thereto to maintain the pH of the reaction mixture. The pH of the reaction mixture in the reactor was maintained at 10.5 to 11.0. The reaction mixture was stirred for 6 hours within the above pH range to allow a first act reaction to occur.

Second Act: Feed Rate of 6.5 L/hr, Stirring Power of 1.0 $kW/m^3$, $NH_4OH$ 0.40 M, pH of 10.5 to 11.0

After 6 hours of the first act reaction, the stirring power inside the reactor was reduced to 1.0 $kW/m^3$, and while the reaction temperature was maintained at 50° C., metal-containing raw materials and 0.40 mol/L (M) of ammonia water were concurrently or simultaneously added at feed rates of 6.5 L/hr and 0.77 L/hr, respectively. The pH of the reaction mixture in the reactor was maintained at 10.5 to 11.0. The reaction mixture was stirred for 16 hours to allow a second act reaction to occur, until particles in the reactor reached a mean particle diameter (D50) of about 11 μm.

Third Act: Feed Rate of 8.50 L/hr, Stirring Power of 0.5 $kW/m^3$, $NH_4OH$ 0.40 M, pH 10.5 to 11.0

After the second act reaction, when the mean particle diameter (D50) of particles in the reactor reached about 11 μm, the stirring power inside the reactor was reduced to 0.5 $kW/m^3$, and while the reaction temperature was maintained at about 50° C., metal-containing raw materials and 0.40 mol/L (M) of ammonia water were concurrently or simultaneously added at feed rates of 8.50 L/hr and 1.03 L/hr, respectively, and NaOH was added to maintain the pH of the reaction mixture. The pH of the solution in the reactor was maintained at 10.5 to 11.0. The reaction mixture was stirred for 5 hours within the above pH range to allow the third act reaction to occur. Subsequently, a slurry solution in the reactor was filtered and washed with high-purity distilled water, followed by drying in a hot-air oven for 24 hours, thereby obtaining a nickel-based active material precursor ($Ni_{0.6}Co_{0.2}Mn_{0.2}(OH)_2$).

Preparation Example 2: Preparation of Nickel-Based Active Material Precursor (7:1.5:1.5)

A mixed solution was prepared in the same manner as in Preparation Example 1, except that nickel (II) sulfate hexahydrate ($NiSO_4 \cdot 6H_2O$), cobalt (II) sulfate heptahydrate ($COSO_4 \cdot 7H_2O$), and manganese (II) sulfate monohydrate ($MnSO_4 \cdot H_2O$) were mixed as metal-containing raw materials in a molar ratio of 7:1.5:1.5 instead of the molar ratio of 6:2:2, and a nickel-based active material precursor ($Ni_{0.7}Co_{0.15}Mn_{0.15}(OH)_2$) was synthesized using the following method.

First Act: Feed Rate of 5.0 L/hr, Stirring Power of 3.0 $kW/m^3$, $NH_4OH$ 0.35 M, pH of 11.0 to 11.5

Ammonia water was added at a concentration of 0.35 mol/L (M) to a reactor equipped with a stirrer. While a stirring power of 3.0 $kW/m^3$ and a reaction temperature of 50° C. were maintained, 2 mol/L (M) of metal-containing raw materials (a mixed solution of nickel sulfate, cobalt sulfate, and manganese sulfate) and 0.35 mol/L (M) of ammonia water were concurrently or simultaneously added at feed rates of 5.0 L/hr and 0.53 L/hr, respectively. Subsequently, NaOH was added to maintain the pH of the reaction mixture. The pH of the reaction mixture in the reactor was maintained at 11.0 to 11.5. The reaction mixture was stirred for 6 hours within the above pH range to allow a first act reaction to occur.

Second Act: Feed Rate of 6.50 L/hr, Stirring Power of 2.5 $kW/m^3$, $NH_4OH$ 0.40 M, pH of 10.5 to 11.00

After 6 hours of the first act reaction, the stirring power in the reactor was reduced to 2.5 $kW/m^3$ and while the reaction temperature was maintained at 50° C., metal-containing raw materials and 0.40 mol/L (M) of ammonia water were concurrently or simultaneously added at feed rates of 6.50 L/hr and 0.77 L/hr, respectively. The pH of the reaction mixture in the reactor was maintained at 10.5 to 11.0. The reaction mixture was stirred for 16 hours to allow a second act reaction to occur, until the mean particle diameter (D50) of particles in the reactor reached about 10 μm.

Third Act: Feed Rate of 8.50 L/hr, Stirring Power of 2.0 $kW/m^3$, $NH_4OH$ 0.45 M, pH of 10.5 to 11.0

After the second act reaction, when the mean particle diameter (D50) of particles in the reactor reached about 10 μm, the stirring power inside the reactor was reduced to 2.0 $kW/m^3$ and while the reaction temperature was maintained at about 50° C., metal-containing raw materials and 0.45 mol/L (M) of ammonia water were concurrently or simultaneously added at feed rates of 8.50 L/hr and 1.15 L/hr, respectively, and NaOH was added to maintain the pH of the reaction mixture. The pH of the reaction mixture in the reactor was maintained at 10.5 to 11.0. The reaction mixture was stirred for 6 hours within the above pH range to allow the third act reaction to occur. Subsequently, a slurry solution in the reactor was filtered and washed with high-purity distilled water, followed by drying in a hot-air oven for 24 hours, thereby obtaining a nickel-based active material precursor ($Ni_{0.7}Co_{0.15}Mn_{0.15}(OH)_2$).

Comparative Preparation Example 1: Preparation of Nickel-Based Active Material Precursor (6:2:2): One-Act Method In the following comparative preparation process, nickel (II) sulfate hexahydrate ($NiSO_4 \cdot 6H_2O$), cobalt (II) sulfate heptahydrate ($CoSO_4 \cdot 7H_2O$), and manganese (II) sulfate monohydrate ($MnSO_4 \cdot H_2O$), as metal-containing raw materials for forming a nickel-based active material precursor, were dissolved in distilled water as a solvent in a molar ratio of 6:2:2 to prepare a mixed solution, and for the formation of a complexing compound, ammonia water ($NH_4OH$) and NaOH as a precipitant were prepared.

Ammonia water was added at a concentration of 0.50 mol/L to a reactor equipped with a stirrer, and while a stirring power of 1.5 $kW/m^3$ and a reaction temperature of 50° C. were maintained, 2 mol/L (M) of metal-containing raw materials and 0.50 mol/L (M) of ammonia water were concurrently or simultaneously added thereto at feed rates of 6.00 L/hr and 1.4 L/hr, respectively, and NaOH was added to maintain the pH of the reaction mixture. The pH of the reaction mixture in the reactor was maintained at 11.4 to 11.6. The reaction mixture was stirred for 33 hours within the above pH range, and when the reaction reached a normal state, the overflown reaction resultant was collected.

The collected reaction resultant was washed and then dried by hot air at 150° C. for 24 hours, thereby preparing a nickel-based active material precursor ($Ni_{0.6}Co_{0.2}Mn_{0.2}(OH)_2$).

Comparative Preparation Example 2: Preparation of Nickel-Based Active Material Precursor A nickel-based active material precursor ($Ni_{0.6}Co_{0.2}Mn_{0.2}(OH)_2$) was prepared in the same manner as in Preparation Example 1, except that the feed rate of the metal-containing raw materials in the second act was changed from 6.50 L/hr to 4.50 L/hr, and the concentration of ammonia water in the reactor was changed from 0.40 mol/L to 0.30 mol/L. However, a large amount of fine powder was generated in the second act so that the size of particles was unable to be further increased.

Comparative Preparation Example 3: Preparation of Nickel-Based Active Material Precursor A nickel-based active material precursor ($Ni_{0.6}Co_{0.2}Mn_{0.2}(OH)_2$) was prepared in the same manner as in Preparation Example 1, except that the stirring power in the second act was changed from 1.0 kW/m$^3$ to 3.0 kW/m$^3$. However, a large amount of fine powder was generated in the second act so that the size of particles was unable to be further increased.

Example 1: Preparation of Nickel-Based Active Material

A composite metal hydroxide ($Ni_{0.6}Co_{0.2}Mn_{0.2}(OH)_2$), which is the nickel-based active material precursor prepared according to Preparation Example 1, and lithium hydroxide (LiOH) were mixed by a dry process in a molar ratio of 1:1 and subjected to heat treatment in an oxygen atmosphere at about 700° C. for 6 hours, thereby obtaining a nickel-based active material ($LiNi_{0.6}Co_{0.2}Mn_{0.2}O_2$). An inside of the obtained nickel-based active material had a porous structure and an outside thereof had a radial arrangement. The nickel-based active material was subjected to heat treatment in an air atmosphere at about 800° C. for 6 hours, thereby obtaining a nickel-based active material ($LiNi_{0.6}Co_{0.2}Mn_{0.2}O_2$) having a secondary particle in which a primary particle agglomerate was in a multicenter isotropic arrangement through dispersion of at least two of the radial centers of primary particles.

Example 2: Preparation of Nickel-Based Active Material

A nickel-based active material was prepared in the same manner as in Example 1, except that the nickel-based active material precursor prepared according to Preparation Example 2 was used instead of the nickel-based active material precursor of Preparation Example 1.

Comparative Example 1: Preparation of Nickel-Based Active Material

A nickel-based active material was prepared in the same manner as in Example 1, except that a nickel-based active material precursor prepared according to Comparative Preparation Example 1 was used instead of the nickel-based active material precursor of Preparation Example 1.

Manufacture Example 1: Manufacture of Coin Cell

A coin cell was manufactured using the nickel-based active material ($LiNi_{0.6}Co_{0.2}Mn_{0.2}O_2$) prepared according to Example 1 as a positive active material by the following method.

A mixture of 96 g of the nickel-based active material ($LiNi_{0.6}Co_{0.2}Mn_{0.2}O_2$) of Example 1, 2 g of polyvinylidene fluoride, 47 g of N-methylpyrrolidone as a solvent, and 2 g of carbon black as a conductive agent was uniformly dispersed using a mixer after removing air bubbles therefrom, thereby preparing a slurry for forming a positive active material layer.

The slurry prepared according to the above-described process was coated onto aluminum foil using a doctor blade to fabricate a thin electrode plate, and then dried at 135° C. for 3 hours or more, followed by roll-pressing and vacuum drying, thereby completing the fabrication of a positive electrode.

The positive electrode and Li metal as a counter electrode were used to manufacture a 2032-type coin cell. A separator (thickness: about 16 μm) formed of a porous polyethylene (PE) film was placed between the positive electrode and the Li metal counter electrode, and an electrolytic solution was injected therebetween, thereby completing the manufacture of a 2032-type coin cell. As the electrolytic solution, a solution prepared by dissolving 1.1 M $LiPF_6$ in a mixed solvent of ethylene carbonate (EC) and ethyl methyl carbonate (EMC) in a volume ratio of 3:5 was used.

Manufacture Example 2: Manufacture of Coin Cell

A coin cell was manufactured in substantially the same manner as in Manufacture Example 1, except that the nickel-based active material prepared according to Example 2 was used instead of the nickel-based active material of Example 1.

Comparative Manufacture Example 1: Manufacture of Coin Cell

A coin cell was manufactured in substantially the same manner as in Manufacture Example 1, except that the nickel-based active material prepared according to Comparative Example 1 was used instead of the nickel-based active material of Example 1.

Evaluation Example 1: Scanning Electron Microscopy

Scanning electron microscopy (SEM) was performed on the nickel-based active material precursors of Preparation Examples 1 and 2 and Comparative Preparation Example 1. A scanning electron microscope used herein was Magellan 400 L (manufactured by FEI Company), and a cross-section of each sample was subjected to pre-processing by milling at 6 kV and 150 μA for 4 hours using CP2 available from JEOL. The SEM was carried out under a condition of 350 V.

Figure 5:
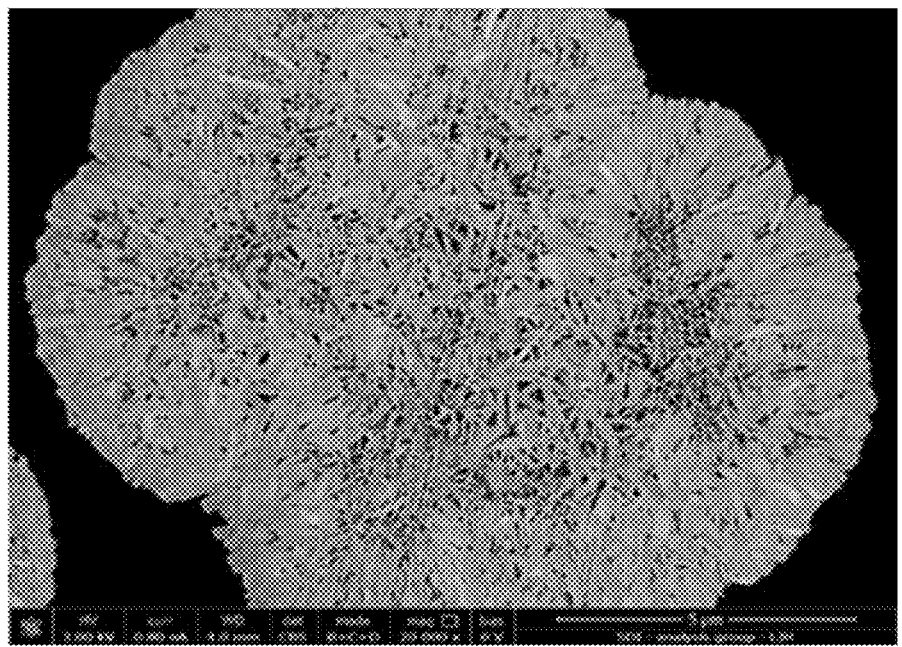
FIG. 5 is a cross-sectional Scanning Electron Microscopy (SEM) image of a secondary particle having a multicenter structure including 3 or 4 radial centers, according to the nickel-based active material precursor of Preparation Example 1.
Figure 6:
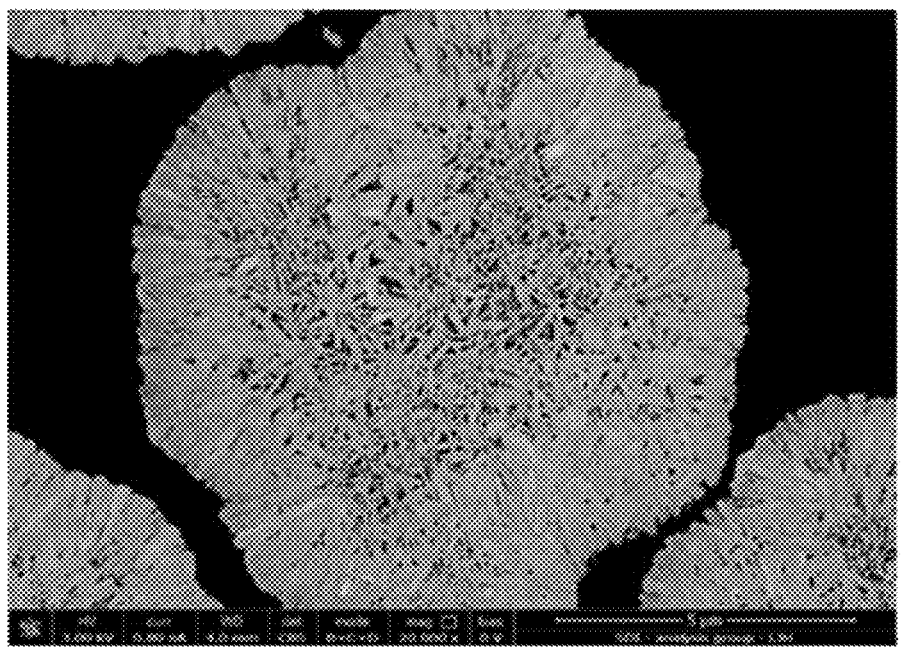
FIG. 6 is a cross-sectional Scanning Electron Microscopy (SEM) image of a secondary particle having a multicenter structure including 3 or 4 radial centers, according to the nickel-based active material precursor of Preparation Example 2.

FIG. 5 is a cross-sectional Scanning Electron Microscopy (SEM) image of the nickel-based active material precursor of Preparation Example 1. FIG. 6 is a cross-sectional SEM image of a secondary particle according to the nickel-based active material precursor of Preparation Example 2. As shown by the SEM results of FIGS. 5 and 6, the nickel-based active material precursors of Preparation Examples 1 and 2, were each prepared as a secondary particle having a multi-center structure including 3 or 4 radial centers. It was also confirmed that each nickel-based active material precursor included a secondary particle in which radial centers respectively included in a plurality of particulate structures are isotropically arranged, wherein each particulate structure included a porous core portion and a shell portion including primary particles radially arranged on the porous core portion. In contrast, in the nickel-based active material precursor of Comparative Preparation Example 1, a single secondary particle had only a center.

Each of the nickel-based active material precursors of Preparation Examples 1 and 2 and Comparative Preparation Example 1 was partially broken, and a cross-section thereof was subjected to SEM. As a result of analysis, it was confirmed that, in the nickel-based active material precursors of Preparation Examples 1 and 2, primary particles included plate particles.

Evaluation Example 2: Composition Analysis

The compositions of the nickel-based active material precursors of Preparation Examples 1 and 2 and Comparative Preparation Example 1 were analyzed by inductively coupled plasma (ICP) analysis, and the results thereof are shown in Table 1.

TABLE 1

| Classification | Ni content (mol %) | Co content | Mn content (mol %) |
|---|---|---|---|
| Preparation Example 1 | 0.607 | 0.198 | 0.195 |
| Preparation Example 2 | 0.705 | 0.145 | 0.149 |
| Comparative Preparation Example 1 | 0.607 | 0.197 | 0.196 |

As shown in Table 1, it was confirmed that the nickel-based active material precursors of Preparation Example 1 and Comparative Preparation Example 1 had a composition of $Ni_{0.6}Co_{0.2}Mn_{0.2}(OH)_2$, and the nickel-based active material precursor of Preparation Example 2 had a composition of $Ni_{0.7}Co_{0.15}Mn_{0.15}(OH)_2$.

Evaluation Example 3: Initial Charge/Discharge Efficiency (I.C.E.)

Each of the coin cells manufactured according to Manufacture Examples 1 and 2 and Comparative Manufacture Example 1 was charged and discharged once at 0.1 C and 25° C. to perform a formation process. Subsequently, each coin cell was subjected to one cycle of charging and discharging at 0.1 C to confirm the initial charging/discharging characteristics of each coin cell. The charging process was set such that it was started with a constant current (CC) mode and changed to a constant voltage (CV) mode, in which the charging process was cut off at 4.3 V and 0.05 C, and the discharging process was set to be cut off at 3.0 V in a CC mode. The initial charge/discharge efficiency (I.C.E.) of each coin cell was calculated according to Equation 1, and the results thereof are shown in Table 2.

Initial charge/discharge efficiency=[discharge capacity at $1^{st}$ cycle/charge capacity at $1^{st}$ cycle]× 100%    Equation 1

TABLE 2

| Classification | Charge capacity | Discharge | I.C.E. (%) |
|---|---|---|---|
| Manufacture Example 1 | 196.4 | 186.4 | 94.9 |
| Manufacture Example 2 | 202.2 | 194.2 | 96.0 |
| Comparative Manufacture Example 1 | 200.0 | 180.9 | 90.5 |

As shown in Table 2, the coin cells of Manufacture Examples 1 and 2 exhibited enhanced charge/discharge efficiency (initial characteristics) at 0.1 C, compared to Comparative Manufacture Example 1.

Evaluation Example 4: Charge/Discharge Characteristics (Rate Capability)

Each of the coin cells of Manufacture Examples 1 and 2 and Comparative Manufacture Example 1 was charged at a constant current of 0.2 C and a constant voltage of 4.3 V, the charging process was cut off at 0.05 C, followed by resting for 10 minutes, and then each coin cell was discharged at a rate of 0.1 C, 0.1 C, 0.1 C, 0.2 C, 0.33 C, 0.5 C, 1 C, 2 C, and 3 C for each of the $1^{st}$ cycle to the $9^{th}$ cycle under constant current until the voltage reached 3.0 V. That is, over 9 cycles of charging and discharging, the discharge current rate was increased to 0.1 C, 0.1 C, 0.1 C, 0.2 C, 0.33 C, 0.5 C, 1 C, 2 C, and 3 C to evaluate the rate capability of each coin cell. The rate capability of each coin cell was measured by Equation 2, and the results thereof are shown in Table 3.

Rate capability=(discharge capacity when cell is discharged at a certain constant current rate)/(discharge capacity when cell is discharged at a rate of 0.1 C($3^{rd}$ cycle))×100%    Equation 2

TABLE 3

| Classification | Constant current | | | |
|---|---|---|---|---|
| | 0.2 C | 0.5 C | 1 C | 2 C |
| Comparative Manufacture | 178.2 mAh/g (98.5%) | 173.1 mAh/g (95.7%) | 167.8 mAh/g (92.6%) | 162.3 mAh/g (89.7%) |
| Manufacture Example 1 | 183.8 mAh/g (98.6%) | 178.3 mAh/g (95.7%) | 173.0 mAh/g (92.8%) | 166.6 mAh/g (89.4) |
| Manufacture Example 2 | 192.1 mAh/g (98.9%) | 186.9 mAh/g (96.2%) | 180.9 mAh/g (93.1%) | 173.1 mAh/g (89.1%) |

As shown in Table 3, the coin cells of Manufacture Examples 1 and 2 exhibited similar rate capability with superior specific capacity to that of the coin cell of Comparative Manufacture Example 1.

Evaluation Example 5: High-Temperature Lifespan Characteristics

High-temperature lifespan characteristics of the coin cells of Manufacture Examples 1 and 2 and Comparative Manufacture Example 1 were evaluated as follows. First, each coin cell was subjected to charging/discharging once at 0.1 C to perform a formation process. Subsequently, each coin cell was subjected to one cycle of charging and discharging at 0.1 C to confirm initial charging/discharging characteristics of each coin cell, and 50 cycles of charging and discharging were repeated at 45° C. and 1 C to measure cycle characteristics of each coin cell. The charging process was set such that it was started with a constant current (CC)

mode and changed to a constant voltage (CV) mode, and then the charging process was cut off at 4.3 V and 0.05 C, and the discharging process was set to be cut off at 3.0 V in a CC mode. The measurement results thereof are shown in Table 4.

TABLE 4

| Classification | Capacity retention rate (50$^{th}$ cycle at 45° C.) |
|---|---|
| Manufacture Example 1 | 99.4% |
| Manufacture Example 2 | 98.5% |
| Comparative Manufacture Example 1 | 97.3% |

As shown in Table 4, the coin cells of Manufacture Examples 1 and 2 exhibited excellent high-temperature lifespan characteristics, compared to the case of Comparative Manufacture Example 1.

As is apparent from the foregoing description, when a nickel-based active material precursor for a lithium secondary battery, according to an embodiment of the present disclosure, is used, lithium diffusion at an interface between a positive active material and an electrolytic solution may be facilitated, and a nickel-based active material into which lithium is more easily diffused may be obtained. In addition, a nickel-based active material in which intercalation and deintercalation of lithium are facilitated and a diffusion distance of lithium ions is shortened may be obtained. A lithium secondary battery manufactured using such a positive active material exhibits enhanced lithium availability, capacity, and lifespan due to suppression of the occurrence of cracks in the active material according to charging and discharging.

It should be understood that embodiments described herein should be considered in a descriptive sense only and not for purposes of limitation. Descriptions of features or aspects within each embodiment should typically be considered as available for other similar features or aspects in other embodiments.

As used herein, the terms "use", "using", and "used" may be considered synonymous with the terms "utilize", "utilizing", and "utilized", respectively. Further, the use of "may" when describing embodiments of the present disclosure refers to "one or more embodiments of the present disclosure".

As used herein, the terms "substantially", "about", and similar terms are used as terms of approximation and not as terms of degree, and are intended to account for the inherent deviations in measured or calculated values that would be recognized by those of ordinary skill in the art.

Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

While one or more embodiments have been described with reference to the figures, it will be understood by those of ordinary skill in the art that various changes in form and details may be made therein without departing from the spirit and scope as defined by the following claims and equivalents thereof.

What is claimed is:

1. A nickel-based active material precursor for a lithium secondary battery, the nickel-based active material precursor comprising:
   a secondary particle comprising a plurality of particulate structures connected in a single structure, each particulate structure of the plurality of particulate structures having a radial center,
   wherein each particulate structure is an agglomerate of a plurality of primary particles, and
   wherein each particulate structure comprises a porous core portion and a shell portion, the shell portion comprising primary particles radially arranged on the porous core portion, and the porous core portion having a higher porosity than the shell portion.

2. The nickel-based active material precursor of claim 1, wherein the plurality of the particulate structures is isotropically arranged in the secondary particle.

3. The nickel-based active material precursor of claim 1, wherein major axes of the primary particles at an outer surface of the secondary particle are normal to the outer surface of the secondary particle.

4. The nickel-based active material precursor of claim 1, wherein major axes of the primary particles in 50% or more of the primary particles at an outer surface of the secondary particle are arranged in a normal direction of a (100) plane or a (110) plane of the primary particles at an outer surface of the secondary particle.

5. The nickel-based active material precursor of claim 1, wherein the primary particles comprise plate particles,
   wherein major axes of the plate particles are radially arranged, and
   a thickness to length ratio of the plate particles is about 1:2 to about 1:20.

6. The nickel-based active material precursor of claim 1, wherein the secondary particle has a size of about 5 μm to about 25 μm.

7. The nickel-based active material precursor of claim 1, wherein the nickel-based active material precursor is a compound represented by Formula 1:

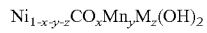

$$Ni_{1-x-y-z}Co_xMn_yM_z(OH)_2 \quad \text{Formula 1}$$

wherein, in Formula 1, M is an element selected from a group consisting of boron (B), magnesium (Mg), calcium (Ca), strontium (Sr), barium (Ba), titanium (Ti), vanadium (V), chromium (Cr), iron (Fe), copper (Cu), zirconium (Zr), tungsten (W), and aluminum (Al), and x≤(1−x−y−z), y≤(1−x−y−z), 0<x<1, 0≤y<1, 0≤z<1, and 0<1−x−y−z<1.

8. The nickel-based active material precursor of claim 7, wherein a nickel content in the nickel-based active material precursor is about 33 mol % to about 95 mol % with respect to a total content of transition metals, wherein the nickel content is the same as or greater than a manganese content and a cobalt content.

9. The nickel-based active material precursor of claim 7, wherein the nickel-based active material precursor is selected from $Ni_{0.6}Co_{0.2}Mn_{0.2}(OH)_2$, $Ni_{0.7}Co_{0.15}Mn_{0.15}$ (OH)$_2$, Ni$_{0.7}$Co$_{0.1}$Mn$_{0.2}$(OH)$_2$, Ni$_{0.5}$Co$_{0.2}$Mn$_{0.3}$(OH)$_2$, Ni$_{1/3}$Co$_{1/3}$Mn$_{1/3}$(OH)$_2$, Ni$_{0.8}$Co$_{0.1}$Mn$_{0.1}$(OH)$_2$, and Ni$_{0.85}$Co$_{0.1}$Al$_{0.05}$(OH)$_2$.

10. A method of preparing a nickel-based active material precursor for a lithium battery, the method comprising:
- a first act of supplying raw materials at a first feed rate and stirring the raw materials to form a precursor seed;
- a second act of supplying the raw materials at a second feed rate to the precursor seed formed by the first act, and stirring a resulting mixture to grow the precursor seed by agglomeration of the resulting mixture; and
- a third act of supplying the raw materials at a third feed rate to precursor particles grown by the second act, and stirring the resulting mixture to control growth of the precursor particles,
- obtaining a resultant secondary particle comprising a plurality of particulate structures connected in a single structure, wherein each particulate structure of the plurality of particulate structures is an agglomerate of a plurality of primary particles,
- wherein the raw materials comprise a complexing agent, a pH adjuster, and a metal-containing raw material for forming the nickel-based active material precursor,
- the second feed rate of the metal-containing raw material is higher than the first feed rate of the metal containing raw material, and the third feed rate of the metal containing raw material is higher than the second feed rate of the metal containing raw material, and
- a stirring power is sequentially reduced as the method proceeds from the first act to the second act to the third act.

11. The method of claim 10, wherein the second feed rate of the metal-containing raw material is increased by about 10% to about 50% with respect to the first feed rate of the metal containing raw material, and the third feed rate of the metal containing raw material is increased by about 10% to about 50% with respect to the second feed rate of the metal containing raw material.

12. The method of claim 10, wherein the metal-containing raw material for forming the nickel-based active material precursor comprises at least one selected from the group consisting of nickel (II) sulfate, nickel (II) nitrate, nickel (II) chloride, nickel (II) fluoride, manganese (II) sulfate, manganese (II) nitrate, manganese (II) chloride, manganese (II) fluoride, cobalt (II) sulfate, cobalt (II) nitrate, cobalt (II) chloride, and cobalt (II) fluoride.

13. The method of claim 10, wherein a stirring power in the first act is about 1.5 kW/m$^3$ to about 4 kW/m$^3$, a stirring power in the second act is about 1 kW/m$^3$ to about 3 kW/m$^3$, and a stirring power in the third act is about 0.5 kW/m$^3$ to about 2 kW/m$^3$.

14. The method of claim 10, wherein a pH of the resulting mixture is reduced or maintained as the method proceeds from the first act to the second act to the third act.

15. A nickel-based active material for a lithium secondary battery, the nickel-based active material being obtained from the nickel-based active material precursor of claim 1.

16. A lithium secondary battery comprising:
- a positive electrode comprising the nickel-based active material of claim 15;
- a negative electrode; and
- an electrolyte between the positive electrode and the negative electrode.

* * * * *